ived Sept. 26, 1961

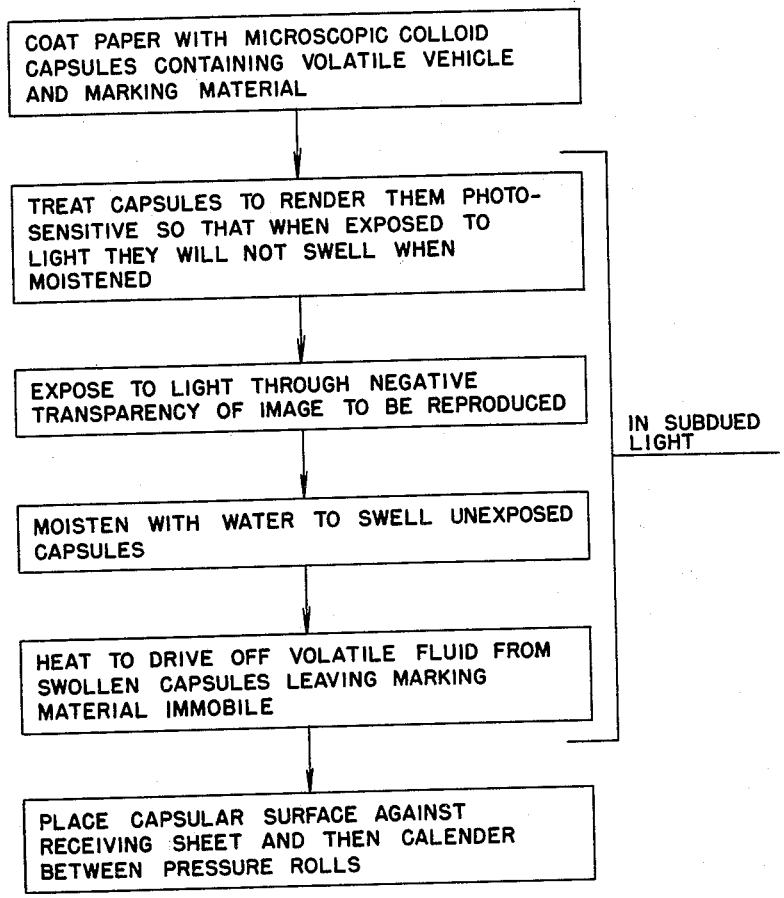

3,001,873
PHOTO-PRINTING PROCESS AND MATERIAL
Peter L. Foris, Dayton, Ohio, assignor to The National Cash Register Company, Dayton, Ohio, a corporation of Maryland
Filed Mar. 22, 1956, Ser. No. 573,172
3 Claims. (Cl. 96—29)

This invention relates to a process of photo-printing and to a photo-sensitive material used therein.

More particularly the process utilizes a web having a photo-sensitive coating on a surface thereof, which coating consists, for the most part, of pressure-rupturable microscopic capsules, the walls of the capsules being of photo-sensitized hydrophilic colloid material, and each of the capsules normally holding a liquid organic vehicle, in which is dispersed or dissolved a solid marking material. The liquid vehicle is volatile at temperatures above room temperature but below the degradation point of the capsular materials. On exposure to light, the capsule walls become resistant to swelling by water. Those capsules not exposed to light may be swelled by water until the capsule wall becomes permeable enough to allow the volatile liquid to escape when vaporized by heat thus leaving behind an immobile solid marking material which will not transfer to an underlying sheet when pressure is applied to the sheet containing the coating. Thus, if the photo-sensitive coating is exposed to light through a negative, and then treated with water so that the unexposed capsules swell, the volatile liquid in them may be driven off by heat, leaving the marking material inside those capsules in solid form. The exposed capsules will still retain the liquid, and the marking material will be in mobile form.

In the next step, a receiving sheet is placed against the exposed and heat-treated sheet, and the two are passed together through a pressure calender, which ruptures the capsules that still contain liquid, thus transferring the image to the receiving sheet. As all the liquid is not squeezed out, if minimal calender pressures are used, as many as ten copies may be made by repeated passing of the exposed web through the calender, using a new receiving surface for each pass. The photo-sensitive material preferably consists of a sheet of paper having coated thereon the pressure-rupturable microscopic capsules containing the volatile organic fluid, such as a petroleum fraction with a boiling point of between 220 and 230 degrees centigrade. Other equivalent volatile fluids are diethyl benzene and dimethyl benzene but the invention is not to be deemed limited to them.

The coloring or marking material may be a solid powdered dye or a solid color-reactant, either colorless or colored, which is dispersed or dissolved in the volatile fluid. The color-reactant may be one adapted to form color on sensitized receiving sheets. In U.S. Patent 2,730,456, which issued on the application of Barrett K. Green and Lowell Schleicher, there is disclosed a paper coated with microscopic capsules filled with marking fluid, except the capsule walls were not photo-sensitive, the liquid vehicle in the capsules was not particularly volatile, and no disclosure is made therein of differential swelling between the capsules exposed to light and those capsules unexposed to light. Nor is there disclosed in that patent the use of a calender for making a print or prints on a receiving sheet, so that the whole area of the web having the coating thereon is subjected to pressure.

If the liquid internal phase of the capsules disclosed in the aforementioned U.S. Patent 2,730,456 were fairly volatile, and if the manifold sheet shown in that patent were treated with a photo-sensitizing agent, it would constitute a photo-sensitive material suitable for use in the process of this invention, such material being of the species in which the marking material is of the colorless color-reactant type.

Among solid dyes which will dissolve in the named volatile vehicles are:

Chrysoidine (yellow-orange), which is m-diaminoazobenzene;
Oil Orange (orange), which is benzene-azo-$\beta$-naphthol;
Sudan II (orange-red), which is xylene-azo-$\beta$-naphthol;
Sudan R (red), which is 2-anisole-azo-$\beta$-naphthol;
Oil Red (red), which as $\alpha$-naphthaline-azo-$\beta$-naphthol;
Sudan Red IV (red), which is o-toluene-azo-o-toluene-azo-$\beta$-naphthol;
Victoria Blue Base (blue), which is tetra-methylphenyl-triamino-diphenyl-$\alpha$-naphthyl carbinol base;
Alizarin Cyanine Green F (blue-green), which is 1,4-di-o-sulpho-p-tolylamino anthraquinone; and
Alizarin Sky Blue (blue), which is 1-amino-2-bromo-4-o-sulpho-p-tolylamino anthraquinone.

The capsule walls are made, preferably, of a complex colloid material consisting of gelatin and gum arabic, which have been combined by coacervation forces around microscopic droplets of the volatile liquid which contains dissolved or dispersed therein the marking material.

One method of forming the capsules used in the coating of the novel product of this invention is that set forth in said U.S. Patent 2,730,456. For instance, 20 grams of gum arabic are dissolved in 160 grams of water and into the resulting sol is emulsified 80 grams of diethyl benzene containing dispersed therein a solid dye to give it color. The emulsification is carried on until the drop-size of the sol-emulsion internal phase is from two to five microns. Next, 20 grams of gelatin are dissolved in 160 grams of water and mixed with the emulsion. This mixture of colloid sols is then diluted by adding water uniformly and slowly, with agitation, until coacervation occurs, the complex gum-arabic and gelatin colloid materials forming around the droplets of oil by coacervation forces. These colloid-surrounded droplets make aggregates of from several microns in diameter up to 70 microns in diameter, depending on the rate and extent of dilution. The added water should amount to about 500 grams. Up to this time all the ingredients are kept at approximately 50 degrees centigrade, which is above the gel point of the ingredients. Now that the colloid material has deposited around the oil droplets, forming particles, the colloid material is caused to gel by pouring it into a quantity of cold water, for instance, water at zero degrees centigrade. The mass is agitated and let stand for one hour, at not over 25 degrees centigrade. At this point the total weight of all ingredients should be about 3960 grams. At this point the pH is adjusted to between 9 and 7, such adjustment being made with sodium hydroxide, and the material is left for 30 minutes or more in this state. The capsules are then hardened by pouring in about 20 grams of a solution of formaldehyde and water of about 37% formaldehyde content, and the materials are agitated for ten minutes or more at three degrees centigrade or lower. This material is adjusted to the right water content to form a coating composition, that is to say, water may be added or taken away by filtering or centrifuging until the right coating viscosity is obtained. At this stage the coating composition is a creamy fluid. If a portion of this fluid is sparsely dispersed in water and placed under a microscope, it will be seen to consist of microscopic capsules of the hydrophilic complex colloid material, the individual capsules being several microns in diameter and containing droplets of liquid containing the marking material. As the water content is decreased, the capsules tend to form aggregations like bunches of grapes.

The gelatin constituent of the capsule wall is then treated with a photo-sensitizing material such as potassium dichromate or ammonium dichromate solution. This may be made up as a 2% solution of the dichromate salt in water, by weight. An amount of this dichromate solution equal to 5% of the weight of the coacervate mixture is mixed with said coacervate capsule dispersion. The photo-sensitized mixture is then coated on paper by rollers, spray, brushes, or any of the commonly used methods of coating paper, and allowed to dry. Alternatively the capsules may first be coated on the paper and then sensitized by dipping it in the dichromate solution.

For greater light sensitivity, up to one hundred times as sensitive, as the dichromate compounds mentioned, the capsules may be treated with a 1 to 2 percent aqueous solution of a sulfate of a diazo compound derived from the condensation product of 4-amino-1,1'-diphenylamine and para-formaldehyde in the approximate ratio of 1.1 to 1.3 moles of para-formaldehyde to 1 mol of 4-diazo-1,1'-diphenylamine, as described in U.S. Patent 2,063,631.

A negative of the image to be reproduced is placed over a sheet of the photo-sensitive material to differentially mask the capsules in the coating, according to the image to be made. A suitable light source for use in exposing the coating is a 15-ampere white flame carbon arc lamp, the distance of the light from the film being about one foot, and the time 10 seconds to a minute for the dichromate type and $1/10$ second for the diazo type.

In the next step the exposed coating is moistened with water, as by passing it across a water dampened absorbent roller, the exposed capsules swelling hardly at all, and the unexposed capsules swelling until their pore size is sufficient for the liquid vehicle inside to escape when volatilized by heat.

The liquid vehicle is volatilized by passing the moistened coating over a drum heated to 110 to 130 degrees centigrade for a period of from 15 to 30 seconds, during which time the liquid in the unexposed capsules has volatilized, leaving the color-reactant or color material in a solid state within the capsule walls.

The coating, drying, moistening and heating should be done in darkness or in a light to which the film material is not sensitive.

The coated side of the exposed paper, which at this point may be subjected to light, is then placed face down on the surface of a receiving sheet, and the two together are passed through a calender press which may be adjusted for the desired pressure. The pressure ruptures the capsules and drives out the liquid inner phase of the capsules which have been exposed, causing transfer of the coloring matter to the receiving sheet. By lightening the pressure, the contents of the capsules which have been exposed and which consequently are in liquid form, does not need to be completely transferred in the first pass. As many as ten copies may be made, as has been said.

If the coloring material is a color-reactant, the receiving sheet must be sensitized with the material which reacts with the color reactant to cause it to form color.

It will be understood that the exposed, moistened, and heated master sheet is characterized by having capsules which have had the liquid phase driven from the unexposed areas and retained in the areas which have been exposed to light. As the capsules are present in the coating in great profusion, the contents of those capsules which are unexposed and close together will, because of their liquid mobility, run together on the receiving sheet and form a completely colored area. If it is desired to have a half-tone effect, the exposure may be made through a screen and the transferred image will be of a half-tone character, because the transferred liquid spots are far enough apart so they will not run together.

The liquid vehicles disclosed herein act satisfactorily for capsules manufactured by the specified process. The permeability of the capsules may be varied. Generally, slow cooling will increase permeability of the capsule walls for the vapor of a given liquid. The final cooling temperature also has an effect. If the final temperature is betwen zero and five degrees centigrade the capsules will be less permeable than capsules finally cooled at 15 to 17 degrees centigrade. The lowering of the pH during the final cooling will increase permeability. These variable conditions will permit the use of liquids of different vapor characteristics, to satisfy the particular demands.

Among the colorless color-reactants may be mentioned crystal violet lactone, which is 3,3 bis(p-dimethylaminophenyl)-6-dimethylamino phthalide; malachite green lactone which is 3,3 bis(p-dimethylaminophenyl) phthalide, both reactive to attapulgite clay with which a receiving sheet may be coated, the former giving a dark blue color and the latter a blue-green color.

What is claimed is:

1. The method of photo-printing, including the steps of exposing to light, through a negative of the image to be reproduced, a sheet coated with microscopic capsules of gelled colloid material containing inclusions of a solid printing substance dispersed in a liquid vehicle which is volatile above room temperature but below the degradation temperature of the colloid material, and said colloid material including gelatin which has been treated with a photo-sensitizing material, so that when the capsules are exposed to light they are resistant to swelling by water, whereas those not exposed to light are not resistant to swelling by water and, hence, if treated with water swell and increase the pore size of the capsule walls; treating the exposed sheet with water; heating the sheet sufficiently to drive out the volatile vehicle from the capsules not exposed to light, which leaves within those capsules the solid printing substance; and finally placing the coated surface on top of a receiving sheet and passing the two together through pressure calender rolls, whereby the light-exposed capsules containing liquid are burst, transferring the liquid and carried printing substance to the receiving sheet.

2. The method of photo-printing by use of a sheet coated with microscopic capsules of gelled hydrophilic colloid material containing inclusions of a solid printing substance dispersed in a liquid vehicle which vaporizes above ordinary room temperatures but below the degradation temperature of the colloid material, and said colloid material including gelatin which has been treated with a light sensitizing material, so that when the capsules are exposed to light they are resistant to swelling by water, whereas those not exposed to light are not resistant to swelling by water and, hence, if treated with water swell increasing the pore size of the capsule walls to permit the passage of vapor therethrough, including the steps of exposing the coated surface of the sheet to light through a negative of the image to be reproduced; treating the light-exposed sheet with water; heating the sheet sufficiently to drive out the volatile vehicle from the capsules not exposed to light, which leaves within those capsules the solid printing substance; and finally placing the coated surface on top of a receiving sheet and passing the two together through pressure calender rolls, whereby the light exposed capsules containing liquid are burst, transferring the liquid and carried printing substance to the receiving sheet.

3. A web; and a coating on a surface of the web, said coating including a profusion of microscopic liquid-containing, pressure-rupturable capsules, the walls of the capsules being of water-swellable hydrophilic colloid material which is non-porous to vapors of volatile organic solvents when not water-swollen and when swollen being vapor-porous, at least half of which colloid material is gelatin which has been photo-sensitized so that the capsules are susceptible to light, rendering any capsule irradiated by light incapable of swelling when moistened with water, the photo-sensitizing materials being selected from the group consisting of potassium dichromate, ammonium dichromate, and a sulfate of a diazo compound made by condensing 4 - amino - 1,1' - diphenylamine and para-formaldehyde in the approximate ratio of 1.1 to 1.3 moles of para-formaldehyde to 1.0 mole of 4-amino-1,1'-diphenylamine, the liquid in the capsules volatilizing below the degradation temperature of the capsule walls, which enables it to escape as a vapor only from capsules which are water-swollen when all of the capsules are heated to the vaporization temperature of the liquid, and said liquid in the capsules carrying a marking material which is a solid and remains a solid in the capsules from which the liquid has escaped as vapor through application of heat thereto.

References Cited in the file of this patent

UNITED STATES PATENTS

| | | |
|---|---|---|
| 2,018,657 | Bennett | Oct. 29, 1935 |
| 2,299,694 | Green | Oct. 20, 1942 |
| 2,332,027 | Jelley et al. | June 15, 1943 |
| 2,756,142 | Yutzy et al. | July 24, 1956 |
| 2,800,077 | Marron | July 23, 1957 |